United States Patent Office 3,312,618
Patented Apr. 4, 1967

3,312,618
PROCESS FOR PREPARING AN OIL SOLUBLE HIGHLY BASIC METAL SALT OF AN ORGANIC ACID
William M. Le Suer, Cleveland, and George R. Norman, Lyndhurst, Ohio, assignors to The Lubrizol Corporation, Wickliffe, Ohio, a corporation of Ohio
No Drawing. Filed July 15, 1966, Ser. No. 565,407
25 Claims. (Cl. 252—33)

This application is a continuation-in-part of copending application Ser. No. 858,603 filed Dec. 10, 1959, which latter application is a continuation-in-part of application Ser. No. 410,461 filed Feb. 15, 1954, and now abandoned.

This invention relates to new compositions of matter and methods of preparing such compositions. In a more particular sense it relates to new compositions of matter which contain unusually large amounts of metal but which are nevertheless fully oil-soluble. These compositions are prepared by a new process which is both economical and convenient.

It has been established that in the preparation of a soap or salt of an organic acid, the use of an excessive amount of a neutralizing agent, such as a metal oxide or hydroxide, results in the formation of a stable product which contains an amount of metal in substantial excess of that which is theoretically required to replace the acidic hydrogens of the organic acid used as the starting material. Such a product may be regarded as a double salt which is indicated by the structure below,

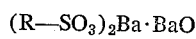

$(R-SO_3)_2Ba \cdot BaO$ applied to the product obtained by the action of an excess of barium oxide with an organic sulfonic acid. Alternatively this type of product may be regarded as a basic salt, indicated by the structure below:

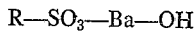

$R-SO_3-Ba-OH$

Regardless of whichever of these or any other structures is accepted, it has been shown that such products are valuable because of their good detergent or dispersant qualities and their property of neutralizing undesirable acidic bodies, as for example, in crankcase lubricants. Such products are in fact more effective for many applications than the corresponding normal salts or soaps.

The processes by which these double salts or basic salts are prepared consist for the most part merely in mixing and heating an acid or its normal salt with an excessive amount of a metal oxide. The maximum amount of metal which can be incorporated into the product in this manner is equivalent to about 2.3 times the theoretical amount present in the normal salt. For the purposes of the present invention the ratio of the total metal in the product to the amount of metal which is in the form of the normal salt of the oil-soluble organic acid will hereinafter be referred to as the "metal ratio."

It will be observed that a metal ratio of 2.3, as contained in a composition which contains a maximum amount of metal as prepared by the process described above, cannot be explained either by the "double salt" or the "basic salt" type of structure. However, a combination of these types, as follows, can be used to indicate products having metal ratios as high as 4.0.

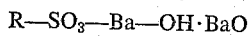

$R-SO_3-Ba-OH \cdot BaO$

It has been discovered that oil-soluble metal-containing compositions can be prepared which contain substantially more metal than indicated by a metal ratio of 2.3. Such compositions may in fact have metal ratios as high as 8.0, 9.0, 20, 30 or more, and it will be appreciated that neither the basic salt, nor the double salt structure, nor a combination of these can illustrate such high metal ratios.

There have accordingly been developed two theories as to the structure of such compositions and both serve to account for large amounts of metal which are present in an oil-soluble material. The one theory presumes the formation of a complex which contains within its molecular structure all of the oil-soluble metal. Various representatives of such complexes are possible and some of these are depicted in U.S. 2,616,905 and 2,616,924. The second theory is based on the ability of an oil-soluble metal salt to disperse ordinarily oil-insoluble particles into a colloidal dispersion. Such a theory thus explains high metal ratio compositions by postulating that the composition is a colloidal dispersion of the metal oxide or hydroxide etc. and that this colloidal dispersion is stabilized by the oil-soluble metal salt.

Such compositions which have high metal ratios, i.e., above 2.3, have been prepared by a process which utilizes a so-called "promoter" material and a certain amount of water to effect the incorporation of excess metal into the oil-soluble normal salt. The promoter has heretofore been selected from among such classes of compounds, as phenols, enols, acid-nitro compounds, low molecular weight organic acids, amides, etc., each of such types of promoters being characterized by its tautomeric nature and:

(a) an ionization constant in water of at least about $1 \times 10^{-10}$ at about 25° C.;
(b) a water solubility at 50° C. of at least about 0.0005%; and
(c) in saturated aqueous solutions at about 25° C. a pH of less than 7.

It has now been discovered that high metal-containing oil-soluble compositions can be prepared by a process which, under certain anhydrous conditions, makes use of other promoters not believed suitable heretofore. The products are economically available from the process of this invention, and are of utility, e.g., as lubricant additives, paint-driers, stabilizers for plastics, emulsifiers, fat-splitting agents, rust-preventives, and the like.

It is a principal object of this invention to provide an oil-soluble metal-containing organic composition which contains in stable form a relatively large amount of metal.

Another object of this invention is to provide a novel process of preparing such compositions.

Further objects of this invention will become apparent in the ensuing description thereof.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly the process of this invention comprises treating an anhydrous process mass consisting essentially of an oil-soluble organic acid, or its oil-soluble metal salt, an organic hydroxy compound, and a basically reacting metal compound, with an inorganic acidic material. The organic hydroxy compound is one in which the hydroxy group is bonded to a non-benzenoid carbon atom. The product of this process is of unknown structure. As indicated previously, the presence of the relatively large amount of metal may be explained by presuming that the product either is an organometallic complex or that it is a stable colloidal dispersion. In view of the uncertainty as to which of these presumptions, if either, is correct, it is preferred to refer to such products in terms of the process by which they may be prepared.

More particularly, this invention relates to a process for the preparation of liquid compositions of matter which contain large amounts of metal and which when admixed with mineral lubricating oil will form clear, filterable masses which comprises:

(I) Preparing and mixing a mass in which at 50° C. at least 50% of the components are in the liquid state, and in which mass the active components consist essentially of at least one each of the following components:
  (A) an oil-soluble organic acid compound, containing at least 12 carbon atoms in the molecule, selected from the class consisting of aliphatic and cyclic; sulfur acids, carboxylic acids, phosphorus acids, the thio acids of any of the foregoing acids, and the metal salts of any of said acids;
  (B) an alcohol having from one to four hydroxyl groups, each of which is bonded to a non-benzenoid carbon atom and having an ionization constant not greater than $1 \times 10^{-11}$ in water at 25° C.;
  (C) a basically reacting metal compound from which the metal cation is liberated when contacted with an acidic material having an ionization constant of at least $1.5 \times 10^{-11}$ in water at 25° C. and present in an amount such that there is present in the mass substantially more than one equivalent of metal per equivalent of A;

(II) treating the mass with substantial amounts of at least one inorganic acidic material of which the ionization constant is at least $1.5 \times 10^{-11}$ in water at 25° C.; and the process characterized further in that
  (a) the reaction mass, when treated with said inorganic acidic material contains substantially no free water; and
  (b) if water is liberated during such treatment step as by the use of a metal hydrate as component B, the temperature and other conditions of reaction are such that substantially all of such liberated water is driven off as it is formed.

Still more particularly, this invention relates to a process for preparing an oil-soluble highly basic metal salt of an organic acid, said process comprising reacting, as the only chemically reactive organic material, an oil-soluble organic acid compound selected from the class consisting of (1) cyclic sulfur acids containing at least 18 carbon atoms per molecule, (2) cyclic carboxylic acids containing at least 17 carbon atoms per molecule and (3) salts of those acids with alkali metals and with alkaline earth metals, in the presence of at least 5% of the weight of said organic acid compound of a lower alkanol, with an alkaline earth metal carbonate formed in situ, by the reaction of carbon dioxide and an alkaline earth metal base, at least a part of said base being in the free state, thereafter removing said alkanol and any water present in the resulting mixture. Preferably the oil-soluble organic acid compound is in solution in a hydrocarbon oil.

As indicated previously, the products of this invention have relatively high metal contents and these are reflected by observed metal ratios of 7.0, 20, 30 or more. The products are permanently soluble in many organic environments and consequently find many applications, particularly as additives in the lubricant field.

OIL-SOLUBLE ORGANIC COMPOUND STARTING MATERIAL

The oil-soluble organic compound which is one of the starting materials used in the process of this invention comprises at least one compound selected from the class consisting of oil-soluble organic acids and metal salts thereof. It may be, for example, a sulfur acid, a carboxylic acid, a phosphorus acid, a thio acid corresponding to any of the foregoing acids, or a metal salt of any of these acids. Similarly mixtures of (a) two or more acids, (b) two or more salts, and (c) at least one acid with at least one salt may be used. The acids preferred for the purposes of the present invention contain at least 12 carbon atoms in the molecule.

Specific examples of sulfur acids and their thio analogs include sulfonic, sulfamic, sulfinic, sulfenic, thiosulfonic acids, etc. and of these the sulfonic acids have been found to be of particular usefulness in the ordinary practice of this invention. Among the sulfonic acids are the following: mahogany sulfonic acid; petrolatum sulfonic acids; mono- and polywax substituted naphthalene sulfonic, phenol sulfonic, diphenyl ether sulfonic, diphenyl ether disulfonic, naphthalene disulfide sulfonic, naphthalene disulfide disulfonic, diphenyl amine disulfonic acids, cetyl-phenol mono-sulfide sulfonic acids, cetoxy caprylbenzene sulfonic acids, di-cetyl thianthrene sulfonic acids such as cetyl chloro-benzene sulfonic acids, cetyl-phenol sulfonic acids, cetyl-phenol disulfide sulfonic acids, cetyl-phenol mono-sulfide sulfonic acids, cetoxy caprylbenzene sulfonic acids, di-cetyl thianthrene sulfonic acids, di-lauryl beta-naphthaol sulfonic acids, and di-capryl nitronaphthalene sulfonic acids; aliphatic sulfonic acids such as paraffin wax sulfonic acids, unsaturated paraffin wax sulfonic acids, hydroxy substituted paraffin wax sulfonic acids, tetraisobutylene sulfonic acids, tetra-amylene sulfonic acids, chloro-substituted paraffin wax sulfonic acids, nitroso paraffin wax sulfonic acids, etc.; cycloaliphatic sulfonic acids, such as petroleum naphthene sulfonic acids, cetyl-cyclopentyl sulfonic acids, lauryl-cyclohexyl sulfonic acids, bis-(diisobutyl)-cyclohexyl sulfonic acids, mono- and poly-wax substituted cyclohexyl sulfonic acids, etc.

With respect to the sulfonic acids, it is intended herein to employ the term "petroleum sulfonic acids" to cover all sulfonic acids which are derived from petroleum products. Additional examples of sulfonic acids and/or alkaline earth metal salts thereof which can be employed as starting materials are disclosed in the following U.S. Patents: 2,174,110, 2,174,560, 2,174,508, 2,193,824, 2,197,800; 2,202,791; 2,212,786; 2,213,360; 2,228,598, 2,233,676, 2,239,974; 2,263,312; 2,276,090; 2,276,097; 2,315,514, 2,319,121, 2,321,022; 2,333,568; 2,333,788; 2,335,259; 2,337,552, 2,346,568, 2,366,027, 2,374,193 and 2,383,319.

The carboxylic acids include the fatty acids wherein there are present at least about 12 carbon atoms, such as, for example, palmitic, stearic, myristic, oleic, linoleic, etc. acids. The carboxylic acids of the aliphatic type can contain elements in the aliphatic radical other than carbon and hydrogen; examples of such acids are the carbamic acids, ricinoleic acids, chloro-stearic acids, nitro-lauric acids, etc. In addition to the aliphatic carboxylic acids, it is intended to employ the cyclic types such as those containing a benzenoid structure, i.e., benzene, naphthalene, etc., and an oil-solubilizing radical or radicals having a total of at least about 15 to 18 carbon atoms, preferably from about 15 to about 200 carbon atoms. Such acids are the oil-soluble aliphatic substituted aromatic acids as for example, stearyl-benzoic acids, mono- or polywax substituted benzoic or naphthoic acids wherein the wax group contains at least about 18 carbon atoms, cetyl hydroxy-benzoic acids, etc. The cyclic type of carboxylic acids also includes those acids which have present in the compound a cyclo-aliphatic group. Examples of such acids are petroleum naphthenic acids, cetyl cyclohexane carboxylic acids, di-lauryl deca-hydronaphthalene carboxylic acids di-octyl cyclopentane carboxylic acids, etc. It is also contemplated to employ the thiocarboxylic acids, that is, those carboxylic acids in which one or both of the oxygen atoms of the carboxyl group are replaced by sulfur.

The phosphorus acids include tri- and pentavalent organic phosphorus acids and the corresponding thio-acids, which are, for example, phosphorous, phosphoric, thiophosphoric, thiophosphorus, phosphinic, phosphonic, thiophosphinic, thiophosphonic, etc. acids. Among the most useful of the phosphorus acids are those represented by the following formulae:

(I) 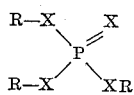

(II) 

wherein X and X' are either oxygen or sulfur and at least one X and one X' is sulfur, and R and R' are each either the same or different organic radicals or hydrogen, and wherein at least one is an organic radical and at least one R is hydrogen and wherein at least one R' is an organic radical and at least R is hydrogen. Therefore, such formulae include the oil-soluble organic thio-acids of phosphorus, more particularly, the organic thiophosphoric acids and the organic thiophosphorus acids. The organic radicals R and R' can be aliphatic, cycloaliphatic, aromatic, aliphatic- and cycloaliphatic-substituted aromatic, etc. The organic radicals R and R' preferably contain a total of at least about 12 carbon atoms, preferably up to about 200 carbon atoms, in each of the above thio-acid types I and II. Examples of such acids are dicapryl dithiophosphoric acids, di-(methylcyclohexyl) dithiophosphoric acids, dilauryl dithiophosphoric acids, dicapryl dithiophosphorous acids, di-(methyl-cyclohexyl) dithiophosphorous acids, lauryl monothiophosphoric acids, di-(butyl-phenyl)dithiophosphoric acids, and mixtures of two or more of the foregoing acids.

Certain of the above described thio-acids of phosphorus such as, for example, di-capryl dithiophosphoric acid are also commonly referred to as acid esters.

A particularly useful type of phosphorus acid may be prepared by the reaction of phosphorus sulfides or chlorides with hydrocarbons having at least 12 aliphatic carbon atoms. One such acid is prepared from a polyisobutylene by treating it with phosphorus pentasulfide or with phosphorus pentasulfide and sulfur, then with steam. The resultant acidic product contains both phosphorus and sulfur. Another such acid is available from the reaction of a polyolefin such as polypropylene with thiophosphoryl chloride, followed by treatment with water. Still another such acid may be prepared by an aluminum chloride catalyzed reaction of a polyolefin with phosphorus trichloride followed likewise by steam treatment. Other phosphorus sulfides useful herein include phosphorus heptasulfide, phosphorus sesquisulfide, thiophosphoric chloride, and phosphoric oxysulfide. Polyolefins useful for this purpose often have molecular weights of from about 150 to about 5000 or up to about 100,000 or even higher. Many other similar reactions will yield phosphorus-containing acids which are highly satisfactory for use in the process described herein.

Products of wide utility in the preparation of improved lubricants can be made according to our process when using as the oil-soluble organic acid compound starting material a mixture of (1) sulfonic acid and at least one of the above described phosphorus acids, or (2) the salts of said acids. As will be noted from several of the examples which follow, one method of carrying out the process of this invention depends upon the in situ formation of the metal salt of the organic acid compound. Thus, instead of using the metal salt of such metal organic compound directly in the process mixture, the oil-soluble organic acid can be mixed with an alcohol and a stoichiometrically excessive amount of alkaline earth metal base and then treated with carbon dioxide as indicated above. This embodiment of the invention is illustrated by the treatment with carbon dioxide of a mixture of naphthenic acid, a lower alkanol and an alkaline earth metal base in the proportions and under the conditions set forth earlier herein, and also by Examples 25, 30, 37 and 41.

As indicated by the examples cited hereinabove the oil-soluble organic compound may be either aromatic, aliphatic, cycloaliphatic, arylaliphatic, etc., just so long as it is an oil-soluble acid or an oil-soluble metal salt of an acid.

ORGANIC HYDROXY COMPOUND STARTING MATERIAL

The broad class of compounds useful as this reagent may be represented by the formula $$Q(OH)_n$$

wherein Q is a substituted or unsubstituted cyclic or acyclic organic radical having at least one non-benzenoid carbon atom; $n$ is an integer of from 1 to 6, preferably, 1 to 4 or 1 to 3, and most desirably 1; and OH is bonded to a non-benzenoid carbon atom in Q; said compound $Q(OH)_n$ having an ionization constant not greater than $1 \times 10^{-11}$ in water at 25° C.

The above formula includes, as its most numerous class, the various monohydric and polyhydric alcohols, of which the monohydric alcohols are preferred. While excellent results are obtained, as shown hereinafter, with unsubstituted monohydric alcohols; i.e., alcohols containing only carbon, hydrogen, and hydroxyl oxygen, for some purposes, as for example use of the end-products of the invention in lubricants, it is often desirable to employ an alcohol which contains at least one substituent group such as; e.g. halogen, amino, sulfide, disulfide, ether, etc.

Best results are usually obtained with monohydric alcohols which do not contain a homocyclic benzenoid ring structure and which have a molecular weight less than 150.

Illustrative of the various $Q(OH)_n$ compounds which may be used in accordance with the invention are: unsubstituted aliphatic monohydric alcohols; e.g., methyl, ethyl, propyl, isopropyl, butyl, sec-butyl, isobutyl, tertiary-butyl, amyl, n-hexyl, 4-methyl-pentyl-2, heptyl, n-octyl, capryl, n-nonyl, isononyl, 2-ethyl-hexyl, decyl, lauryl, and tetradecyl alcohols; substituted aliphatic monohydric alcohols; e.g. chloro-hexyl, bromo-octyl, fluoro-decyl, aminoethyl, methoxyethoxyethyl, and methylmercapto-ethyl alcohols; unsubstituted cycloaliphatic monohydric alcohols; e.g. cyclohexyl, methyl-cyclohexyl, propyl-cyclohexyl, amyl-cyclohexyl, octyl-cyclohexyl, tetrahydrofurfuryl, and decahydronaphthyl alcohols; substituted cycloaliphatic monohydric alcohols; e.g. 2-chloro-cyclohexyl and chlorinated methyl-cyclohexyl alcohols; aromatic-substituted aliphatic monohydric alcohols; e.g. benzyl, p-chlorobenzyl, p-aminobenzyl, phenethyl, p-chlorophenethyl, and furfuryl alcohols; cycloaliphatic-substituted aliphatic monohydric alcohols; e.g. cyclohexylmethyl, cyclohexyl-ethyl, and methylcyclohexylethyl alcohols; and the various polyhydric alcohols which contain from 2 to 6 hydroxyl groups; e.g., ethylene glycol, propylene, glycol, quercitol, inositol, sucrose, mannose, sorbitol, butylene-glycol, glycerol, cyclohexandiol-1,4, pentaerythritol, and the like.

It is also within the scope of the present invention to use mixtures of two or more $Q(OH)_n$ compounds. Particularly useful in some instances are combinations of a low-boiling alcohol, such as methanol, with a high-boiling alcohol, such as isononyl alcohol.

BASIC METAL COMPOUNDS

These compounds are basically reacting metal compounds from which the metal cation is liberated when contacted with an acidic material having an ionization constant of at least $1.5 \times 10^{-11}$ in water at 25° C. Such compounds include those of alkali and alkaline earth metals such as sodium, potassium, lithium, magnesium, strontium, barium, and calcium. These compounds are present in an amount such that there is present in the mass substantially more than one equivalent of metal per equivalent of oil-soluble organic acid compound.

Oxides and hydroxides comprise the principal and most useful constituents of this group; others are the sulfides, hydrosulfides, amides, alcoholates derived from alcohols having, for example, from 1 to about 30 carbon atoms, etc. Specific examples of the most useful basic metal compounds include barium oxide, barium hydroxide, lithium oxide, lithium hydroxide, sodium hydroxide, alcoholates, such as barium methoxide, calcium ethoxide, strontium isopropoxide, etc. The basic inorganic metal compounds are preferred because of their cheapness and availability.

THE INORGANIC ACIDIC MATERIAL

As previously indicated, the present invention includes the treatment of the mass with an inorganic acidic material having an ionization constant greater than the organic hydroxy compound. This treatment results in the liberation of at least a portion of the organic hydroxy compound. A particularly effective inorganic acidic material which has been utilized for this purpose is carbon dioxide.

It is an important feature or characteristic of the inorganic acid material that it must possess an ionization constant higher than the organic hydroxy compound. Thus, in the present invention the acidic material must have an ionization constant greater than $1 \times 10^{-11}$ in water at 25° C. The inorganic acidic material can be a liquid, gas, or solid prior to being incorporated into the mass. However, the acidic material is usually employed as a liquid or a gas. Liquids can include strong or weak acids, such as, for example, hydrochloric, sulfuric, nitric, carbonic acids, etc., whereas the gas is for the most part an anhydride of an acid or an "acid anhydride gas."

The following are additional specific examples of acidic materials, viz: $HCl$, $SO_2$, $SO_3$, $CO_2$, air (considered acidic because of $CO_2$ content) $NO_2$, $H_2S$, $N_2O_2$, $PCl_3$, $ClO_2$, $H_2Se$, $SOCl_2$, $BF_3$, $CS_2$, $COS$, $H_2CrO_4$, etc.

It is to be understood, however, that all acidic materials are not equivalent for the purposes of the present invention, but that under certain conditions some are more effective or desirable than others. Special preference is given to carbon dioxide.

A substantial amount of acidic material must be employed in the process, generally, enough to substantially reduce the titratable basicity of the mass, and usually in amount sufficient to substantially neutralize the mass. Amounts in excess of that required to substantially neutralize the mass may, of course, be used. Such stoichiometric excess, however, does not alter the basic characteristics of the process, although in some instances it is a commercial expedient to facilitate an efficient utilization of the other ingredients of the process mixture. In some cases, however, where the acidic material employed is carbon dioxide and the basically reacting metal compound is an alkaline earth metal base it is preferred that the amount of carbon dioxide reactant is less than the amount theoretically required to convert the free alkaline earth metal base to the corresponding alkaline earth metal carbonate. This embodiment of the invention is illustrated by Examples 5, 7, 15, 16, 30, 35 and 41.

PROCESS CONDITIONS

The organic metal compositions of this invention may be prepared by mixing an oil-soluble organic acid or its oil-soluble salt with an $Q(OH)_n$ compound, and a basic metal compound and introducing the inorganic acidic material such as carbon dioxide into the process mass. For example, the oil-soluble organic acid (or salt), the $Q(OH)_n$ compound, and the basic metal compound may be mixed, then treated with gaseous carbon dioxide. Alternatively the basic inorganic metal compound may be added portionwise to a mixture of the first two ingredients mentioned above, while carbon dioxide is bubbled into the reaction mixture.

The amount of alcohol which is to be used in the process is not critical and it is necessary only that an appreciable amount be used. Thus, for each equivalent weight of basic, inorganic barium compound which is used, at least 0.1 equivalent weight of alcohol will usually be employed. Preferably, the amount of alcohol will be 0.25 equivalent or more, on the same basis. As indicated earlier this minimum amount of alcohol may also be expressed as at least 5% of the weight of the organic acid compound used in the process.

The process mass must be substantially anhydrous, that is, contain substantially no free water, during the step in which the mass is treated with the inorganic acidic material. If water is liberated during such step, as by the use of metal hydrate of the basically reacting metal compound, the temperature and other conditions of reaction should be such that substantially all of such liberated water is driven off as it is formed.

The addition of the basic inorganic metal compound to a mixture of oil-soluble organic acid (or salt) and $Q(OH)_n$ compound results in the evolution of heat. Likewise, the addition of the inorganic acidic material to this mass is an exothermic reaction and it liberates heat. Thus, a typical reaction requires the application of little or no heat, although in some cases it may be advisable to provide some external heating. A wide range of temperature is permissible, ranging from room temperature or even lower, up to about 200° C.

A preferred process involves the simultaneous portionwise addition of basic inorganic metal compound and carbon dioxide to a mixture of oil-soluble acid (or salt) and aliphatic alcohol. The temperature of such a reaction is conveniently that of the refluxing mixture, which in turn is determined principally by the boiling point of the $Q(OH)_n$ compound employed.

In some instances, however, it may not be convenient to effect the portionwise addition of a solid reagent (the basic metal compound) and in such instances it is preferable first to mix the oil-soluble acid (or salt), $Q(OH)_n$ compound, and basic metal compound, and then to bubble in carbon dioxide or add the inorganic acidic material. The mixture may be heated prior to the inorganic acidic material treatment, and likewise it may be desirable to heat the mixture during the inorganic acidic material treatment.

As essential feature of the process of this invention is that there must be present simultaneously in the reaction mass, inorganic acidic material and a basic metal compound. This combination is necessary for the success of the process and without it, e.g., carbonation completed before addition of the basic metal compound, the products of this process cannot be prepared. Obviously there must also be present in the reaction mass an oil-soluble acid (or salt) and a $Q(OH)_n$ compound.

The product which results from any of the above described methods of processing may be further treated so as to remove volatile materials. Such materials will include principally the $Q(OH)_n$ compound, and they may be removed by distillation, either at atmospheric pressure or reduced pressure. The ordinary practice of the invention involves distilling at atmospheric pressure until no more will distill and then removing the last traces of volatile matter by heating the mixture under reduced pressure.

The following examples will illustrate the process in greater detail. These examples are illustrative only and should not be construed as limiting the scope of the invention. Example 1 shows the inoperability of the process when no carbon dioxide was present in the reaction mixture. The other examples all illustrate the process of this invention.

The 40 percent barium petroleum sulfonate employed in many of the examples refers to a 40 percent by weight oil solution of barium mahogany sulfonates. The term "Neut. No." refers to the neutralization value as determined by ASTM Test No. D-974-48T.

Example 1

A mixture of 1110 grams (1.0 equivalent) of 40 percent barium petroleum sulfonate, 470 grams of mineral oil, 256 grams (8.0 equivalents) of methanol and 306 grams (4.0 equivalents) of barium oxide was heated with stirring at reflux temperature for one hour. At this point the mixture had become quite viscous and efforts to reduce this viscosity by heating, treatment with nonyl alcohol, water, etc. were unsuccessful.

Example 2

A mixture of 1285 grams (1.0 equivalent) of 40 percent barium petroleum sulfonate and 500 ml. (12.5 equivalents) of methanol was stirred at 55–60° C. while 301 grams (3.9 equivalents) of barium oxide was added portionwise over a period of one hour. The mixture was stirred an additional two hours at 45–55° C., then treated with carbon dioxide at 55–65° C. for two hours. The resulting mixture was freed of methanol by heating to 150° C. The residue was filtered through Hyflo, a siliceous filter aid, the clear brown filtrate showing the following analyses:

Sulfate ash, percent _____ 33.2
Neut. No. _____ Slightly acid
Metal ratio _____ 4.7

Example 3

A solution of 1285 grams (1.0 equivalent) of 40 percent barium petroleum sulfonate in 420 grams (7.0 equivalents) of isopropyl alcohol was treated at 65–70° C. with 301 grams (3.9 equivalents) of barium oxide. The resulting mixture was stirred for one hour at 85–90° C., then treated with carbon dioxide for nine hours, and filtered through Hyflo. The filtrate was clear and showed the following analyses:

Sulfate ash, percent _____ 23.4
Neut. No. (basic) _____ 2
Metal ratio _____ 3.0

Example 4

A solution of 1285 grams (1.0 equivalent) of 40 percent barium petroleum sulfonate in 420 grams (7.0 equivalents) of n-propyl alcohol was treated at 60–100° C. with stirring with 301 grams of barium oxide. The mixture was heated at reflux temperature for one hour, then treated at this same temperature for two hours with carbon dioxide. After the first hour of carbon dioxide-treatment the reaction mass had become quite viscous, but half an hour later it was very fluid. The resulting mixture was concentrated by heating to 125° C./18 mm., then filtered through Hyflo. The clear, brown filtrate showed the following analyses:

Sulfate ash, percent _____ 27.5
Neut. No. (acidic) _____ 1.1
Metal ratio _____ 3.7

Example 5

A solution of 1285 grams (1.0 equivalent) of 40 percent barium petroleum sulfonate in 518 grams (7.0 equivalents) of n-butyl alcohol was stirred at 70° C. while 301 grams (3.9 equivalents) of barium oxide was added. Then the mixture was heated at 125–130° C. for one hour, treated with carbon dioxide at 120–130° C. for an additional two hours, and concentrated by heating to 140° C./20 mm. The product was filtered through Hyflo, yielding a clear, brown liquid which showed the following properties:

Sulfate ash, percent _____ 32.1
Neut. No. (basic) _____ 3.6
Metal ratio _____ 4.5

Example 6

A mixture of 1285 grams (1.0 equivalent) of 40 percent barium petroleum sulfonate, 408 grams (4.0 equivalents) of 2-methylpentanol-4, and 301 grams (3.9 equivalents) of barium oxide was heated to 165° C. over a period of one hour and then held at 150–160° C., for an additional hour. Carbon dioxide was bubbled through the mixture for four and one-half hours at this temperature, and the resulting mixture was filtered through Hyflo. The filtrate was a dark brown oil having the following analyses:

Sulfate ash, percent _____ 27.2
Neut. No. (acidic) _____ 0.5
Metal ratio _____ 3.6

Example 7

A mixture of 1533 grams (15.0 equivalents) of 2-methylpentanol-4, 301 grams (3.9 equivalents) of barium oxide, and 1285 grams (1.0 equivalent) of 40 percent barium petroleum sulfonate was heated to 135° C. over a period of one hour and held at reflux temperature for an additional hour. Carbon dioxide was bubbled through the mixture for 2.5 hours at 140°–150° C. then the mixture was concentrated by heating to 165° C./20 mm., and filtered through Hyflo. The filtrate was a dark brown liquid having the following analyses:

Sulfate ash, percent _____ 24.1
Neut. No. (basic) _____ 2.8
Metal ratio _____ 3.1

Example 8

To a solution of 1285 grams (1.0 equivalent) of 40 percent barium petroleum sulfonate in 714 grams (7.0 equivalents) of n-hexyl alcohol there was added with stirring at 75° C., 301 grams (3.9 equivalents) of barium oxide. The resulting mixture was heated at 150° C. for one hour, then treated at 140–145° C. with carbon dioxide for two hours. This mixture was concentrated by heating to 150° C./20 mm. Filtration of the residue through Hyflo yielded a liquid having the following analyses:

Sulfate ash, percent _____ 27.2
Neut. No. (basic) _____ 0.5
Metal ratio _____ 3.8

Example 9

A mixture of 301 grams (3.9 equivalents) of barium oxide, 1285 grams (1.0 equivalent) of 40 percent barium petroleum sulfonate and 1010 grams (7.0 equivalents) of nonyl alcohol was heated over a period of two hours to 200° C., then heated with continued stirring at 205–210° C. for an additional hour. Carbon dioxide was bubbled into the hot (190–205° C.) mixture for two hours, and then the mixture was concentrated by heating to 200° C./18 mm. The residue was filtered through Hyflo to yield as filtrate a clear, brown oil having the following analyses:

Sulfate ash, percent _____ 29.3
Neut. No. (acidic) _____ 0.2
Metal ratio _____ 4.0

Example 10

A solution of 1928 grams (1.5 equivalents) of 40 percent barium petroleum sulfonate in 1004 grams of oil and 188 ml. (4.7 equivalents) of methanol was prepared and heated to 40° C. Carbon dioxide was bubbled into this solution and 796 grams (10.4 equivalents) of barium oxide was added portionwise over a period of two hours. The temperature was maintained between 40° C. and 70° C. throughout and when all the barium oxide had been added the carbon dioxide-treatment was continued for an additional four hours. The resulting mixture then was heated to 150° C. and held at this temperature for 30 minutes to remove any volatile material. The residue was filtered through Hyflo yielding a clear, brown filtrate, having the following analyses:

Sulfate ash, percent _____ 32.6
Neut. No. (basic) _____ 1.2
Metal ratio _____ 7.2

Example 11

Carbon dioxide was bubled into a solution of 1045 grams (1.0 equivalent) of 45 percent calcium petroleum sulfonate in 100 grams (3.1 equivalents) of methanol while the solution was being stirred at 40–65° C. and while 306 grams (3.9 equivalents) of barium oxide was being added portionwise over a period of two hours. The carbon dioxide-treatment was continued for an additional hour and then 350 grams of mineral oil was added. The resulting mixture was dried by heating to 150° C., and then was filtered through Hyflo. The filtrate was a brown oil, having the following analyses:

Sulfate ash, percent _____ 15.7
Neut, No. _____ Nil
Metal ratio _____ 2.9
Calcium, percent _____ 1.0

Example 12

A mixture of 671 grams (1.0 equivalent) of 60 percent sodium petroleum sulfonate, 464 grams of mineral oil, and 100 grams of methanol (3.0 equivalents) was stirred at 40–55° C. while carbon dioxide was being bubbled into the mixture and 237 grams (3.1 equivalents) of barium oxide was being added portionwise over a period of one hour. The carbon dioxide-treatment was continued for an additional 1.5 hours at 65–70° C. and then the mixture was freed of volatile materials by heating at 150° C. for 30 minutes. The dried mixture was filtered through Hyflo, yielding a brown filtrate, having the following analyses:

Sulfate ash, percent _____ 29.0.
Neut. No. _____ Slightly basic.
Metal ratio _____ 3.9.
Sodium, percent _____ 1.6.

It will be noted in the above example that the in situ formation of barium sulfonate is accomplished.

Example 13

A mixture of 318 grams (0.5 equivalent) of petroleum sulfonic acid (Acid No. 88), 60 grams of methanol (1.9 equivalents) and 240.5 grams of mineral oil was stirred at 35° while 64.7 grams (1.9 equivalents) of lithium hydroxide monohydrate was added. This mixture was heated at reflux temperature for an hour, then treated with carbon dioxide at 145–155° C. for an hour and filtered through Hyflo. The filtrate was brown oil, having the following analyses:

Sulfate ash, percent _____ 6.1
Neut. No. (basic) _____ 1.1
Metal ratio _____ 1.3

Example 14

A mixture of 575 grams (0.5 equivalent) of barium polydodecylbenzene sulfonate, 153 grams (2.0 equivalents) of barium oxide, 288 grams of nonyl alcohol (2.0 equivalents) and 140 grams of mineral oil was heated at 150°–160° C. while carbon dioxide was bubbled in until the mixture was substantially neutral. The resulting mixture was filtered through Hyflo. The filtrate showed the following analyses:

Sulfate ash, percent _____ 15.1
Neut. No. (acidic) _____ 2.0
Metal ratio _____ 2.8

Example 15

A mixture of 555 grams (0.5 equivalent) of 40 percent barium petroleum sulfonate, 31 grams of glycerol (1.0 equivalent) and 416 grams of mineral oil was prepared and heated to 100° C. over a period of one hour. Barium oxide (154 grams, 2.0 equivalents) was added portionwise over a period of 15 minutes and then the temperature was raised to and held at 160–170° C. for an hour. The mixture was treated with carbon dioxide for an hour at 150° C., heated at 160–190° C. under reduced pressure for an hour, and filtered through Hyflo. The filtrate was a brown, non-viscous liquid, having the following analyses:

Sulfate ash, percent _____ 12.7
Neut. No. (basic) _____ 3.4
Metal ratio _____ 2.5

Example 16

To a mixture of 555 grams (0.5 equivalent) of 40 percent barium petroleum sulfonate, 31 grams of ethylene glycol (1.0 equivalent) and 416 grams of mineral oil there was added with stirring at 103–112° C., 154 grams (2.0 equivalents) of barium oxide. Ten minutes was required for the portionwise addition, after which the mixture was heated at 160–178° C. for an hour. The mixture then was treated with carbon dioxide at 150° C. for one hour and finally heated at 150–170° C. at reduced pressure for an additional hour. The mixture was filtered through Hyflo, yielding as filtrate a brown, non-viscous liquid having the following analyses:

Sulfate ash, percent _____ 19.6
Neut. No. (basic) _____ 12.2
Metal ratio _____ 3.9

Example 17

To a stirred mixture of 555 grams (0.5 equivalent) of 40 percent barium petroleum sulfonate, 108 grams (1.0 equivalent) of benzyl alcohol and 416 grams of mineral oil, there was added at 105°–120° C. 154 grams (2.0 moles) of barium oxide. The addition was made portionwise over a period of ten minutes. The mixture was heated gradually to 150° C. and held at 150–160° C. for an hour. Carbon dioxide was bubbled into the hot (153–162° C.) mixture for an hour and the resultant product was heated at 150° C. at reduced pressure for another hour. Filtration of this material through Hyflo yielded a clear, brown, non-viscous liquid which had the following analyses:

Sulfate ash, percent _____ 19.8
Neut. No. _____ Slightly basic
Metal ratio _____ 4.0

Example 18

One hundred and fifty-four grams (2.0 equivalents) of barium oxide was added portionwise at 100° C. over a period of 15 minutes to a stirred mixture of 555 grams (0.5 equivalent) of 40 percent barium petroleum sulfonate, 100 grams (1.0 equivalent) of cyclohexanol and 416 grams of mineral oil. The resultant mixture was heated slowly to 150° C. and held at 150–178° C. for an hour, then treated for an hour at 150° C. with carbon dioxide. The mixture was heated at 150° C. at reduced pressure to remove volatile materials and then was filtered through Hyflo. The clear, brown, non-viscous filtrate showed the following analyses:

Sulfate ash, percent _____ 13.9
Neut. No. _____ Slightly acid
Metal ratio _____ 2.9

Example 19

A mixture of 555 grams (0.5 equivalent) of 40 percent barium petroleum sulfonate, 98 grams (1.0 equivalent) of furfuryl alcohol and 416 grams of mineral oil was heated at 103–120° C. while 154 grams (2.0 equivalents) of barium oxide was added over a period of ten minutes. This mixture was heated slowly to 150° C. and held at that approximate temperature for an hour. Carbon dioxide was bubbled into the mixture at this temperature for an hour, and then all volatile materials were removed by heating for an hour at 150° C. at diminished pressure. Filtration of this product through Hyflo yielded a clear, brown, non-viscous, liquid having the following analyses:

Sulfate ash, percent _____ 23.6
Neut. No. (basic) _____ 1.1
Metal ratio _____ 4.8

*Example 20*

A mixture of 555 grams (0.5 equivalent) of 40 percent barium petroleum sulfonate, 177 grams (1.0 equivalent) of dichlorobenzyl alcohol, and 416 grams of mineral oil was heated at 100° C. while 154 grams (2.0 equivalents) of barium oxide was added portionwise over a period of ten minutes. The temperature was raised slowly to 150° C. and held thereafter at 150–170° C. for an hour. Then carbon dioxide was bubbled into the mixture at 150° C. for 1.5 hours. Volatile materials were removed by heating for an hour at 150–165° C. at reduced pressure. Filtration through Hyflo yielded a brown, non-viscous liquid, having the following analyses:

Sulfate ash, percent _____ 12.0
Neut. No. (acidic) _____ 0.8
Metal ratio _____ 2.7

*Example 21*

A mixture of 278 grams (0.25 equivalent) of 40 percent barium petroleum sulfonate, 122 grams (0.8 equivalent) of monochlorinated methyl-cyclohexanol, and 208 grams of mineral oil was heated at 100° C. while 77 grams (1.0 equivalent) of barium oxide was added portionwise over a ten-minute period. The temperature was raised slowly to 150° C. and held there for 30 minutes. Carbon dioxide was bubbled into the hot (150–158° C.) mixture for an hour. The resultant mixture was freed of volatile matter by heating for an hour at 150–187° C. at reduced pressure. Filtration of the residue through Hyflo yielded as filtrate a clear, brown, non-viscous liquid which had the following analyses:

Sulfate ash, percent _____ 19.4
Neut. No. (acidic) _____ 3.9
Metal ratio _____ 4.1

*Example 22*

A mixture of 1285 grams (1.0 equivalent) of 40 percent barium petroleum sulfonate, 306 grams (3.0 equivalents) of 2-methyl pentanol-4 and 144 grams (1.0 equivalent) of nonyl alcohol was stirred at 75° C. while 301 grams (3.9 equivalents) of barium oxide was added. The resultant mixture was heated with continued stirring for an hour at 145–150° C., then treated with carbon dioxide for 1.5 hours at 140–150° C. Volatile materials were removed by heating to 170° C./18 mm. and the residue was filtered through Hyflo. The filtrate was a clear, dark brown, non-viscous liquid having the following analyses:

Sulfate ash, percent _____ 22.9
Neut. No. _____ Nil
Metal ratio _____ 3.2

*Example 23*

A stirred mixture of 57 grams (0.4 equivalent) of nonyl alcohol and 301 grams (3.9 equivalents) of barium oxide was heated at 150–175° C. for an hour, then cooled to 80° C. whereupon 400 grams (12.5 equivalents) of methanol was added. The resultant mixture was stirred at 70–75° C. for 30 minutes, then treated with 1285 grams (1.0 equivalent) of 40 percent barium petroleum sulfonate. This mixture was stirred at reflux temperature for an hour, then treated with carbon dioxide at 60–70° C. for two hours. The mixture then was heated to 160° C./18 mm. and filtered through Hyflo. The filtrate was a clear, brown oil having the following analyses:

Sulfate ash, percent _____ 32.5
Neut. No. _____ Nil
Metal ratio _____ 4.7

*Example 24*

A stirred solution of 1285 grams (1.0 equivalent) of 40 percent barium petroleum sulfonate, 408 grams (4.0 equivalents) of 2-methyl pentanol-4, and 400 grams (12.5 equivalents) of methanol was maintained at 40–58° C. while 301 grams (3.9 equivalents) of barium oxide was added portionwise over a period of one hour. The mixture was stirred for an hour at 60–70° C., then treated with carbon dioxide at the same temperature for two hours. Volatile materials were removed by heating the reaction mass to 150° C./17 mm. and the residue was filtered through Hyflo. The filtrate was a clear, brown oil having the following analyses:

Sulfate ash, percent _____ 33.6
Neut. No. _____ Nil
Metal ratio _____ 4.7

*Example 25*

To a stirred mixture of 795 grams (0.5 equivalent) of the barium salt of a phosphorus- and sulfur-containing acid (prepared by treating a polyisobutylene with phosphorus pentasulfide and sulfur, then with steam) and 643 grams (0.5 equivalent) of 40 percent barium petroleum sulfonate there was added at 40° C., 306 grams (4.0 equivalents) of barium oxide. Carbon dioxide then was bubbled into the mixture while 100 grams (3.1 equivalents) of methanol was added portionwise over a period of 1.5 hours at 40–60° C. The carbon dioxide treatment was continued for an additional 3.5 hours at 60–70° C. The mixture was freed of volatile materials by heating to 150° C., then it was filtered. The filtrate was a clear, brown, viscous oil having the following analyses:

Barium content, percent _____ 15.2
Neut. No. _____ Slightly basic
Metal ratio _____ 4.6

*Example 26*

A 516-gram sample (0.67 equivalent) of a phosphorus- and sulfur-containing acid (prepared by treating a polyisobutylene with thiophosphoryl chloride, then with steam) was mixed with 102 grams of mineral oil and 42.8 grams (1.3 equivalents) of methanol and heated to 35° C.; 51.2 grams (0.67 equivalent) of barium oxide was added and the resultant mixture was stirred at reflux temperature for an hour. An additional 106.5 grams (1.41 equivalent) of barium oxide then was added portionwise throughout the next 45 minutes at 35–55° C. and while carbon dioxide was being bubbled into the mixture; the carbon dioxide treatment was continued for an additional two hours at 55–60° C., whereupon the mixture was heated to 150° C. then filtered through Hyflo. The filtrate had the following analyses:

Barium content, percent _____ 16.1
Neut. No. _____ Slightly acidic
Metal ratio _____ 2.8

*Example 27*

A mixture of 83.5 grams (0.25 equivalent) of O,O-di-n-hexyl dithiophosphoric acid, 234 grams of mineral oil, 277 grams (0.25 equivalent) of 40 percent barium petroleum sulfonate and 32 grams (1.0 equivalent) of methanol was stirred at 38° C. while being treated with 19.1 grams (0.25 equivalent) of barium oxide over a period of ten minutes. The resultant mixture was heated at reflux temperature for 1.5 hours, then cooled and treated at 40–55° C. over a 45-minute period with an additional 79.5 grams (1.04 equivalents) of barium oxide while carbon dioxide was being bubbled into the mixture. The carbon dioxide treatment was continued for 80 minutes after all the barium oxide had been added. The reaction mass then was heated to 150° C. and filtered through Hyflo. The filtrate was a clear, brown oil, with a slightly sweet odor, and having the following analyses:

Barium content, percent _____ 13.7
Neut. No. (acidic) _____ 0.6
Metal ratio _____ 2.9

*Example 28*

A mixture of 555 grams (0.5 equivalent) of 40 percent barium petroleum sulfonate, 87 grams (0.27 equivalent of O,O-di-(2-methyl pentyl-4) dithiophosphoric acid, 428 grams of mineral oil and 55.5 grams (1.7 equivalents) of methanol was prepared and warmed with agitation to 40° C. whereupon 20.3 grams (0.27 equivalent) of barium oxide was added. This mixture was heated with continued agitation at 60–70° C. for an hour, then treated at 40–55° C. with carbon dioxide and an additional 153 grams (2.0 equivalents) of barium oxide over a 45 minute period. The carbon dioxide treatment was continued for an additional hour, then the product mixture was heated to 150° C. and filtered through Hyflo. The filtrate is a clear, brown oil having the following analyses:

Barium content, percent _____ 13.5
Neut. No. _____ Slightly acidic
Metal ratio _____ 3.2

*Example 29*

A mixture of 209 grams (0.5 equivalent) of O,O-diisooctyl dithiophosphoric acid, 555 grams (0.5 equivalent) of 40 percent barium petroleum sulfonate, 197 grams of mineral oil, and 64 grams (2.0 equivalents) of methanol was warmed to 35° C., then treated with 38.3 grams (0.5 equivalent) of 40 percent barium petroleum sulfonate over a 10-minute period. This mixture was heated at reflux temperature for an hour, and simultaneously treated over a 1-hour period at 40–60° C. with carbon dioxide and an additional 195 grams (2.08 equivalents) of barium oxide. The carbon dioxide treatment was continued for another 20 minutes and then the product mixture was heated to 150° C. and filtered through Hyflo. The filtrate was a clear, brown oil having a slightly foul odor, and the following analyses:

Barium content, percent _____ 15.0
Neut. No. (acidic) _____ 0.4
Metal ratio _____ 2.5

*Example 30*

To a mixture of 580 grams (0.5 equivalent) of dieicosyl salicylic acid, 72 grams (0.5 equivalent) of nonyl alcohol, 63 ml. (2.0 equivalents) of methanol, there was added portionwise 153 grams (2.0 equivalents) of barium oxide. A stream of carbon dioxide (2 cu. ft./hour) was bubbled into the mixture for two hours during which time the temperature rose from 40° C. to 70° C. The resulting mixture was heated to 150° C., then filtered through Hyflo. The filtrate showed the following analyses:

Sulfate ash, percent _____ 27.2
Neut. No. (basic) _____ 3.5
Metal ratio _____ 3.8

*Example 31*

To a well-stirred mixture of 125 grams (0.5 equivalent) of naphthenic acid, 555 grams (0.5 equivalent) of a 40 percent barium petroleum sulfonate solution, 144 grams (1.0 equivalent) of nonyl alcohol and 125 ml. (4.0 equivalents) of methanol there was added portionwise 268 grams (3.5 equivalents) of barium oxide, while simultaneously, carbon dioxide was bubbled into the mixture at a rate of 2 cu. ft./hour. The temperature rose to 70° C. during this time and the carbon dioxide treatment was continued until the mixture was neutral. Then the neutral product was heated to a final temperature of 150° C./13 mm. and filtered through Hyflo. The filtrate was a clear liquid having the following analyses:

Sulfate ash, percent _____ 43.1
Neut. No. (basic) _____ 2.5
Metal ratio _____ 3.6

*Example 32*

To a well-stirred mixture of 1558 grams (1.5 equivalents) of a 60 percent oil solution of magnesium petroleum sulfonate and 188 ml. (4.7 equivalents) of methanol there was added portionwise 344 grams (4.5 equivalents) of barium oxide while simultaneously the mixture was treated with carbon dioxide. Two hours were required for the barium oxide addition during which time the temperature rose to 60° C. and the carbon dioxide treatment was continued for an additional two hours. The mixture was filtered through Hyflo, yielding a clear liquid filtrate having the following analyses:

Magnesium, percent _____ 1.1
Barium, percent _____ 7.0
Neut. No. (acidic) _____ 14.7
Metal ratio _____ 2.2

*Example 33*

Seventy-nine grams (1.04 equivalents) of barium oxide was added, at 85–100° C., to a mixture of 428 grams (0.25 equivalent) of the barium salt of the phosphorus- and sulfur-containing acid of Example 25, 277 grams (0.25 equivalent) of 40 percent barium petroleum sulfonate, 98 grams (1.0 equivalent) of furfuryl alcohol and 45 grams of water. The mixture was heated to 150° C., and treated at this temperature with carbon dioxide until it was neutral. The mixture then was heated at 150° C./10 mm. and filtered through Hyflo. The filtrate was a clear light brown, slightly viscous liquid having the following analyses:

Barium, percent _____ 12.0
Neut. No. _____ Slightly acid
Metal ratio _____ 3.0

*Example 34*

To a mixture of 1140 grams (1.0 equivalent) of 40 percent barium petroleum sulfonate, 196 grams (2.0 equivalent) of furfuryl alcohol, 52 grams of mineral oil and 75 grams of water, there was added, at 80–100° C., 168 grams (4.0 equivalents) of lithium hydroxide monohydrate. The resulting mixture was heated to 150° C. and treated for one hour with carbon dioxide. The neutralized mixture was filtered through Hyflo, yielding as filtrate a clear, dark brown, slightly viscous liquid having the following analyses:

Barium, percent _____ 4.4
Lithium, percent _____ 1.2
Neut. No. _____ Slightly acidic
Metal ratio _____ 3.1

*Example 35*

Five equivalents (392 grams) of barium oxide was added portionwise over a period of 45 minutes to a well-stirred mixture of 1638 grams (1.25 equivalents) of lead petroleum sulfonate, 245 grams (2.5 equivalents) of furfuryl alcohol, and 625 grams of mineral oil heated at 85–130° C. Carbon dioxide was bubbled into the mixture throughout this period and additionally until the mixture was neutral. The neutral mixture was concentrated by heating to a final temperature of 150° C./30 mm., and the residue filtered through Hyflo. The filtrate was a slightly viscous, clear, brown liquid having the following analyses:

| | |
|---|---|
| Lead content, percent | 4.9 |
| Barium content, percent | 10.6 |
| Neut. No. (basic) | 34.0 |
| Metal ratio | 4.3 |

*Example 36*

A mixture of 574 grams (0.5 equivalent) of 40 percent barium pertoleum sulfonate, 98 grams (1.0 equivalent) of furfuryl alcohol, and 762 grams of mineral oil was heated with stirring at 100° C. for an hour, then treated portionwise over a 15-minute period with 230 grams (3.0 equivalents) of barium oxide. During this latter period the temperature rose to 120° C. (because of the exothermic nature of the reaction of barium oxide and the alcohol); the mixture then was heated at 150–160° C. for an hour, and treated subsequently at this temperature for 1.5 hours with carbon dioxide. The material was concentrated by heating to a final temperature of 150° C./10 mm. then filtered through Hyflo to yield a clear, oil-soluble filtrate having the following analyses:

| | |
|---|---|
| Sulfate ash, percent | 21.4 |
| Neut. No. (basic) | 2.6 |
| Metal ratio | 6.1 |

*Example 37*

To a stirred mixture of 250 grams (1.0 equivalent) of naphthenic acid, 102 grams (1.0 equivalent) of furfuryl alcohol, and 1228 grams of mineral oil there was added 83 grams (1.1 equivalents) of barium oxide. This mixture was heated to 120° C. and treated portionwise over a period of one hour with an additional 300 grams (3.9 equivalents) of barium oxide. Carbon dioxide was bubbled into the mixture throughout this hour, during which the temperature rose to 150° C. This temperature was maintained for an additional hour whereupon the mixture was concentrated by heating to a final temperature of 160° C./10 mm. The hot residue was filtered through Hyflo to yield a clear, brown, oil-soluble liquid having the following analyses:

| | |
|---|---|
| Sulfate ash, percent | 23.0 |
| Neut. No. (basic) | 1.7 |
| Metal ratio | 3.6 |

*Example 38*

To 1000 grams (7.7 moles) of 2-ethylhexanol there was added with stirring over a period of one hour 100 grams (0.73 mole) of freshly out barium. This mixture then was heated at 150° C. with continued stirring for two hours, at which point all of the solid barium had disappeared. The solution was filtered.

A mixture of 610 grams (0.686 equivalent) of a barium alcoholate solution, was prepared above, and 366 grams (0.33 equivalent) of 40 percent barium pertoleum sulfonate was stirred at 100° C. for an hour. The temperature was raised to 150° C. whereupon a stream of carbon dioxide was bubbled into the mixture for two hours. The 2-ethylhexanol was removed by heating the mixture to a final temperature of 150° C./5 mm. The residue was filtered through Hyflo (a siliceous filter aid) and a clear, brown, slightly viscous filtrate was obtained which had the following analyses:

| | |
|---|---|
| Sulfate ash, percent | 24.9 |
| Neut. No. (basic) | 0.8 |
| Metal ratio | 3.1 |

*Example 39*

To a solution of 534 grams (0.44 equivalent) of a basic barium petroleum sulfonate having a metal ratio of 2.2 in 133 grams of mineral oil there was added with stirring at 60–70° C. 1000 grams (1.26 equivalents) of a barium alcoholate solution prepared as in Example 38. The resulting mixture was heated at this temperature for an hour, then treated at 150° C. with carbon dioxide for an hour. The product was concentrated by heating to a final temperature of 155° C./2 mm., and the residue was filtered through Hyflo. The filtrate was a clear, brown, non-viscous liquid which showed the following analyses:

| | |
|---|---|
| Sulfate ash, percent | 28.9 |
| Neut. No. | Slightly acid |
| Metal ratio | 4.7 |

*Example 40*

To 800 grams of methanol there was added portionwise with stirring at room temperature 306 grams (4.0 equivalents) of barium oxide, and the resulting mixture was stirred at reflux temperature for an hour. The product mixture was filtered and the filtrate was concentrated by heating to 40° C./15 mm. The residue was a white solid which weighed 376 grams.

A mixture of 188 grams (1.84 equivalents) of the above product, 582 grams (0.45 equivalent) of 40 percent barium petroleum sulfonate, and 45 grams of methanol was stirred at 60–70° C. for 30 minutes, then treated at 60–70° C. with carbon dioxide for three hours; the resulting product was heated to 150° C. and filtered through Hyflo. The filtrate was a clear, brown oil having the following analyses:

| | |
|---|---|
| Sulfate ash, percent | 31.1 |
| Neut. No. | Slightly acid |
| Metal ratio | 4.5 |

*Example 41*

To 2000 ml. of methanol at reflux temperature there was added portionwise 120 grams (10 equivalents) of magnesium. The resulting solution was treated with 735 grams of mineral oil and 1216 grams (2.0 equivalents) of petroleum sulfonic acid and then heated at reflux temperature for an hour. Methanol was removed by distillation, leaving a viscous residue to which was added with stirring at 80° C. over a period of 20 minutes, 72 grams (8 equivalents) of water. The resulting clear, brown product had the following analyses:

| | |
|---|---|
| Sulfate ash, percent | 19.5 |
| Neut. No. (basic) | 102.2 |
| Metal ratio | 4.8 |

This product was warmed to 80° C. and treated with carbon dioxide for five hours at which point further carbon dioxide treatment failed to reduce the Neut. No. of 9.0.

*Example 42*

Barium methylate was prepared by adding 206 grams (3.0 equivalents) of barium to 300 grams of well-stirred methanol. The temperature rose from 24° C. to 75° C. and stirring was continued at this reflux temperature for two hours. The mixture was concentrated by heating to 70° C./5 mm. leaving a white solid residue apparently free of unchanged barium.

To this white solid (barium methylate) there was added 100 grams of methanol, 1148 grams (1.0 equivalent) of 40 percent barium petroleum sulfonate and 16 grams of mineral oil, and the whole was heated with stirring at 72° C. for an hour. The resulting clear solution was divided into two equal portions, A and B which were treated as follows:

(A) The one portion was treated with carbon dioxide at 72–75° C. until (2.5 hours) slightly acidic as indicated by phenolphthalein. It was then concentrated by heating to 150° C., and 435 grams of mineral oil was added. The fluid mixture was filtered and the brown filtrate shown to have the following:

| | |
|---|---|
| Sulfate ash, percent | 17.4 |
| Neut. No. (acidic) | 2.0 |
| Metal ratio | 3.5 |

(B) The other portion was treated with sulfur dioxide at 72–78° C. for three hours, at which point the mixture showed a slightly acidic reaction to phenolphthalein. The mixture was heated to 150° C. and diluted with 189 grams of mineral oil and 16 grams of nonyl alcohol (to reduce viscosity) and then filtered. The product showed the following:

| | |
|---|---|
| Sulfate ash, percent | 22.6 |
| Neut. No. (acidic) | 8.6 |
| Metal ratio | 3.5 |

*Example 43*

A 40 percent solution of barium petroleum sulfonate in mineral oil, weighing 574 grams (0.5 equivalent), was heated to 150° C. and diluted with 238 grams of mineral oil and then treated with 90 grams (1.0 equivalent) of ethyl Cellosolve. To this mixture, now at 110° C., there was added 153 grams (2.0 equivalents) of barium oxide and the resulting mass was heated with stirring at 150–160° C. for an hour. Then carbon dioxide was bubbled into the mixture at 150–160° C. for an hour. This temperature was maintained for an additional hour prior to filtering the mass through Hyflo. The filtrate was a clear, brown, fluid mass having the following analyses:

| | |
|---|---|
| Sulfate ash, percent | 26.9 |
| Neut. No. (basic) | 4.3 |
| Metal ratio | 4.7 |

*Example 44*

To 574 grams (0.5 equivalent) of a 40 percent barium petroleum sulfonate solution in mineral oil, at 150° C., there was added an additional 238 grams of mineral oil. At this point the temperature had receded to 115° C. and 61 grams (2.0 equivalents) of ethanol-amine was added; then 153 grams (2.0 equivalents) of barium oxide was added and the resulting mixture was heated at 150–160° C. for an hour. Carbon dioxide was bubbled into the mass at 150–160° C. for an hour, after which this temperature was maintained for an additional hour. The mixture was filtered through Hyflo to yield a light brown, fluid filtrate having the following analyses:

| | |
|---|---|
| Sulfate ash, percent | 24.5 |
| Neut. No. (acidic) | 5.4 |
| Metal ratio | 4.3 |

*Example 45*

To 1900 grams (2.3 equivalents) of an oil solution of a 50–50 mixture of sodium petroleum sulfonate and sodium didodecyl benzene at 95° C. there was added 142 grams (1.28 equivalents) of calcium chloride in 200 grams of water. This mixture was heated for an additional two hours at 95° C. whereupon 148 grams (4.0 equivalents) of calcium hydroxide was added. This mixture was heated for 5 hours at 150° C. and then blown with nitrogen at this temperature for 30 minutes to remove the water. The mixture was allowed to cool to 35° C. and then 500 grams of methanol was added. This mixture was treated with carbon dioxide until the Neut. No. of the mixture was 0.7 (basic). The product was diluted with an additional 230 grams of oil and then freed of methanol by distillation. The product was filtered through a siliceous filter aid, the filtrate showing the following:

| | |
|---|---|
| Sulfate ash, percent | 16.4 |
| Neut. No. (acidic) | 2.5 |
| Metal ratio | 2.6 |

*Example 46*

A mixture of 1,305 grams (1.3 equivalents) of a carbonated basic calcium sulfonate having a metal ratio of 2.5 (prepared by the reaction of a sodium petroleum sulfonate with calcium chloride and calcium hydroxide), 930 grams of mineral oil, 220 grams of methanol, 72 grams of isobutyl alcohol and 38 grams of amyl alcohol was prepared, heated to 35° C. and subjected to the following operating cycle 4 times:

Add 143 grams of 90% calcium hydroxide and treat with carbon dioxide until the mixture has a base No. of 32–39.

The product is then heated to 155° C. during a period of nine hours to remove the alcohols, and then filtered through a silicone filter aid at this same temperature. The filtrate has the following analyses:

| | |
|---|---|
| Sulfate ash, percent | 39.5 |
| Neut. No. | 30 |
| Metal ratio | 12.2 |

Other modes of applying the principle of the invention may be employed, change being made as regards the details described, provided the features stated in any of the following claims, or the equivalent of such, be employed.

We therefore particularly point out and distinctly claim as our invention:

1. A process for preparing an oil soluble highly basic metal salt of an organic acid, said process comprising reacting under substantially anhydrous conditions as the only chemically reactive organic material, an oil soluble organic acid compound selected from the class consisting of (1) cyclic sulfur acids containing at least 18 carbon atoms per molecule, (2) cyclic carboxylic acids containing at least 17 carbon atoms per molecule and (3) salts of those acids with alkali metals and with alkaline earth metals, in the presence of at least 5% of the weight of said organic acid compound of a lower alkanol, with an alkaline earth metal carbonate formed in situ by the reaction of carbon dioxide and an alkaline earth metal base in an amount such that there is present in the reaction mass substantially more than two equivalents of the metal base per equivalent of the organic acid compound, at least a part of said base being in the free state, thereafter removing said alkanol and any water present in the resulting mixture.

2. A process for preparing an oil soluble highly basic metal salt of an organic acid, said process comprising reacting under substantially anhydrous conditions, as the only chemically reactive organic material, an oil soluble organic acid compound selected from the class consisting of (1) cyclic sulfur acids containing at least 18 carbon atoms per molecule, (2) cyclic carboxylic acids containing at least 17 carbon atoms per molecule and (3) salts of those acids with alkali metals and with alkaline earth metals, said oil soluble organic acid compound being in solution in a hydrocarbon oil, in the presence of at least 5% by weight of said organic acid compound of a lower alkanol with an alkaline earth metal carbonate formed in situ by the reaction of carbon dioxide and an alkaline earth metal base in an amount such that there is present in the reaction mass substantially more than two equivalents of the metal base per equivalent of the organic acid compound, at least a portion of said metal base being in the free state, and thereafter removing said alkanol and any water present in the resulting mixture.

3. A process according to claim 2 wherein the amount of carbon dioxide reacted is less than the amount theoretically required to convert the free alkaline earth metal base to the corresponding alkaline earth metal carbonate.

4. A process for preparing an oil soluble highly basic metal salt of an alkyl-substituted salicylic acid, said process comprising mixing under substantially anhydrous conditions a hydrocarbon oil solution containing as the only chemically reactive material an oil soluble alkaline earth metal salt of an alkyl-substituted salicylic acid in which each alkyl group contains at least eight carbon atoms with at least 5% of the weight of the said salt of a lower alkanol, and with an alkaline earth metal base, at least a part of said base being in the free state, adding carbon dioxide to the resulting mixture and thereafter removing said alkanol and any water present in the resulting mixture.

5. A process according to claim 4 wherein the alkaline earth metal salt of the alkyl-substituted salicylic acid is formed in situ by reaction of the alkyl-substituted salicylic acid and an alkaline earth metal base.

6. A process for preparing an oil soluble highly basic metal salt of petroleum sulfonic acid, said process comprising mixing under substantially anhydrous conditions a hydrocarbon oil solution containing as the only chemically reactive material an oil soluble alkaline earth metal salt of a petroleum sulfonic acid with at least 5% of the weight of the said salt of a lower alkanol, and with an alkaline earth metal base in an amount such that there is present in the reaction mass substantially more than two equivalents of the metal base per equivalent of the organic acid compound, at least a part of said base being in the free state, adding carbon dioxide to the resulting mixture and thereafter removing said alkanol and any water present in the resulting mixture.

7. A process according to claim 6 wherein the alkaline earth metal salt of the petroleum sulfonic acid is formed in situ by reaction of the petroleum sulfonic acid and an alkaline earth metal base.

8. A process according to claim 6 wherein the amount of carbon dioxide reacted is less than the amount theoretically required to convert the free alkaline earth metal base to the corresponding alkaline earth metal carbonate.

9. A process according to claim 6 wherein the alkaline earth metal salt of the petroleum sulfonic acid is formed in situ by reaction of an alkali metal salt of the petroleum sulfonic acid and an alkaline earth metal base.

10. A process for preparing an oil soluble highly basic metal salt of a naphthenic acid, said process comprising mixing under substantially anhydrous conditions a hydrocarbon oil solution containing as the only chemically reactive material an oil soluble alkaline earth metal salt of a naphthenic acid with at least 5% of the weight of the said salt of a lower alkanol, and with an alkaline earth metal base, at least a part of said base being in the free state, adding carbon dioxide to the resulting mixture and thereafter removing said alkanol and any water present in the resulting mixture.

11. A process according to claim 10 wherein the alkaline earth metal salt of the naphthenic acid is formed in situ by reaction of the naphthenic acid and an alkaline earth metal base.

12. The process which comprises preparing a substantially anhydrous mass consisting essentially of
(a) an oil-soluble organic acid compound containing at least 12 carbon atoms selected from the class consisting of sulfonic acids, naphthenic acids, alkylated aromatic carboxylic acids, phosphorus thioic acids and the metal salts of any of said acids;
(b) a basically reacting metal compound from which the metal cation is liberated when contacted with an acidic material having an ionization constant greater than $1.5 \times 10^{-11}$ in water at 25° C. and present in an amount such that there is present in the mass substantially more than 2 equivalents of metal per equivalent of (a);
(c) at least 0.1 equivalent of an alcohol per equivalent of (b); and
treating the mass with an inorganic acidic material.

13. The process which comprises preparing a substantially anhydrous mass consisting essentially of
(a) an oil-soluble organic acid compound containing at least 12 carbon atoms selected from the class consisting of sulfonic acids, naphthenic acids, alkylated aromatic carboxylic acids, phosphorus thioic acids and the metal salts of any of said acids;
(b) a basically reacting metal compound from which the metal cation is liberated when contacted with an acidic material having an ionization constant greater than $1.5 \times 10^{-11}$ in water at 25° C. and present in an amount such that there is present in the mass substantially more than 2 equivalents of metal per equivalent of (a);
(c) at least 0.1 equivalent of an alcohol per equivalent of (b); and
treating the mass with carbon dioxide.

14. The process of claim 13 characterized further in that the organic acid compound of component (a) is a metal salt of a sulfonic acid.

15. The process of claim 13 characterized further in that the metal compound of component (b) is barium oxide.

16. The process of claim 13 characterized further in that the alcohol of component (c) is an alkanol.

17. The process which comprises preparing a substantially anhydrous mass consisting essentially of
(a) an oil-soluble metal salt of an organic sulfonic acid;
(b) substantially more than 1 equivalent of barium oxide per equivalent of (a);
(c) at least 0.1 equivalent of an alkanol per equivalent of (b); and
treating the mass with carbon dioxide.

18. The process of claim 17 characterized further in that the metal salt of component (a) is a metal salt of a mahogany sulfonic acid.

19. The process of claim 17 characterized further in that the alkanol of component (c) is methanol.

20. The process which comprises preparing a substantially anhydrous mass consisting essentially of
(a) a barium salt of a mahogany sulfonic acid;
(b) substantially more than 1 equivalent of barium oxide per equivalent of (a);
(c) at least 0.1 equivalent of methanol per equivalent of (b); and
treating the mass with carbon dioxide.

21. The process of claim 12 wherein the inorganic acidic material is selected from the class consisting of $SO_2$, $H_2S$ and $CO_2$.

22. The process of claim 13 wherein the oil soluble organic acid compound of (a) is a sulfonic acid or an alkaline earth metal salt thereof; the basic reacting metal compound of (b) is an akaline earth metal oxide, hydroxide, or alcoholate; and the alcohol of (c) is an alkanol having a molecular weight less than about 150.

23. The process of claim 13 wherein the oil soluble organic acid compound of (a) is a sulfonic acid or a calcium salt thereof; the basic reacting metal compound of (b) is calcium oxide or hydroxide and the alcohol of (c) is methanol.

24. A process, for preparing an oil soluble highly basic metal salt of an organic acid, said process comprising reacting under substantially anhydrous conditions as the only chemically reactive organic material, an oil soluble organic acid compound selected from the class consisting of (1) cyclic sulfur acids containing at least 18 carbon atoms per molecule, (2) cyclic carboxylic acids containing at least 17 carbon atoms per molecule and (3) salts of those acids with alkali metals and with alkaline earth metals, in the presence of at least 5% of the weight of said organic acid compound of a lower alkanol, with an alkali or alkaline earth metal carbonate formed in situ by the reaction of carbon dioxide and an alkali or alkaline earth metal base in an amount such that there is present in the reaction mass substantially more than two equivalents of the metal base per equivalent of the organic acid compound, thereafter removing said alkanol and any water present in the resulting mixture.

25. The process of claim 24 wherein the oil soluble organic acid compound is a calcium sulfonate, the lower alkanol is methanol, and the metal carbonate is calcium carbonate formed in situ by the reaction of carbon dioxide and a calcium base.

References Cited by the Examiner

UNITED STATES PATENTS 2,616,906  11/1952  Asseff et al. _____ 260—399
2,616,924  11/1952  Asseff et al. _____ 252—33 X DANIEL E. WYMAN, *Primary Examiner.*

W. H. CANNON, *Examiner.*

UNITED STATES PATENT OFFICE
CERTIFICATE OF CORRECTION

Patent No. 3,312,618                                                    April 4, 1967

William M. Le Suer et al.

It is certified that error appears in the above identified patent and that said Letters Patent are hereby corrected as shown below:

Column 2, line 22, "acid-nitro" should read -- aci-nitro --. Column 3, line 45, "onsisting" should read -- consisting --. Column 4, lines 14 to 16, "acids, cetyl-phenol mono-sulfide sulfonic acids, cetoxy cparylbenzene sulfonic acids, di-cetyl thianthrene sulfonic" should read -- , diphenyl amine sulfonic, thiophene sulfonic, alpha-chloro-naphthalene sulfonic acids, etc; other substituted sulfonic --; line 38, "2,174,560" should read -- 2,174,506 --. Column 8, line 48, "As" should read -- An --. Column 14, line 68, "O,O-di-n" should read -- O,O-di-n --. Column 15, line 17, "O,O-di-" should read -- O,O-di- --; line 35, "O,O-diiso-" should read -- O,O-diiso- --. Column 17, line 59, "pertroleum" should read -- petroleum --. Column 20, line 36, "aids" should read -- acids --.

Signed and sealed this 10th day of March 1970.

(SEAL)
Attest:

EDWARD M. FLETCHER, JR.                            WILLIAM E. SCHUYLER, JR.
Attesting Officer                                          Commissioner of Patents